J. BLOSS & E. J. WHITE.
MINING APPARATUS.
No. 10,212. Reissued Oct. 10, 1882.
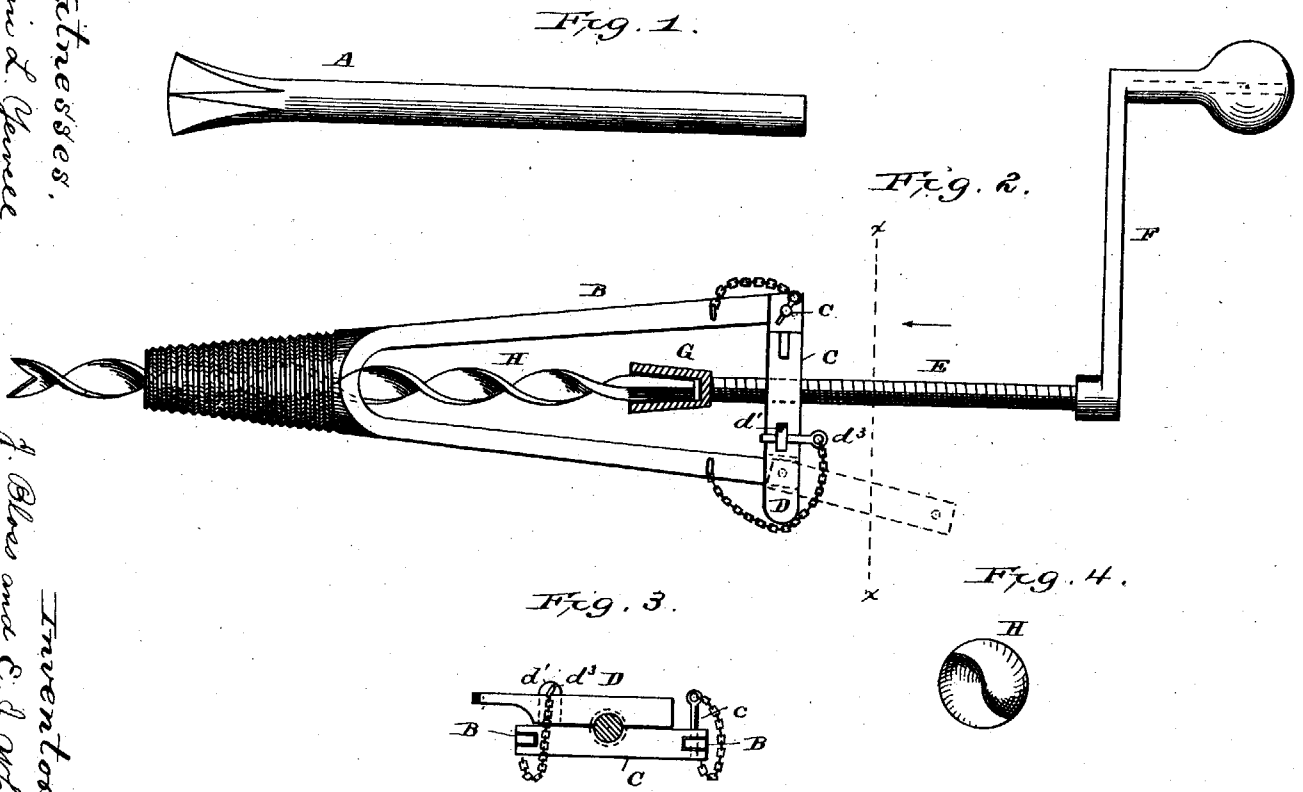
Witnesses,
Edwin L. Yewell.
N. A. Faulmin
Inventors
J. Bloss and E. J. White,
By E. M. Alexander.
Attorney.
N. PETERS, Photo-Lithographer, Washington, D. C.

UNITED STATES PATENT OFFICE.

JOSIAH BLOSS, OF LEADVILLE, COLORADO, AND ELISHER J. WHITE, OF WILKES-BARRÉ, PENNSYLVANIA.

MINING APPARATUS.

SPECIFICATION forming part of Reissued Letters Patent No. 10,212, dated October 10, 1882.

Original No. 159,296, dated February 2, 1875. Application for reissue filed June 17, 1882.

*To all whom it may concern:*

Be it known that we, JOSIAH BLOSS, of Leadville, Lake county, Colorado, and ELISHER J. WHITE, residing at Wilkes-Barré, in the county of Luzerne and State of Pennsylvania, citizens of the United States, have invented certain new and useful Improvements in Mining Apparatus, of which the following is a specification, reference being had therein to the accompanying drawings.

This invention relates to certain improvements in mining-drills, and is specially designed for drilling coal to form blasting-recesses therein for the reception of the blasting-charge, although it may be employed with equal advantage in drilling various substances to be mined or quarried, such as slate, stone, and the like.

Our invention has for its object to provide certain means whereby the apparatus may be attached directly to the surface or body of the material to be drilled, so as to form a bearing or "purchase" for the drill, by means of which the proper pressure to force the drill into the said body may be provided.

The invention further has for its objects to provide certain improved means whereby the drill may be advanced into the body as it is rotated, and for withdrawing it without unnecessary loss of time; and, further, to provide a strong, light, and durable apparatus of such simplicity that it will not be liable to get out of repair or require frequent adjustment. These objects we attain by the means illustrated in the accompanying drawings, in which—

Figure 1 represents a side view of an ordinary drill; Fig. 2, a side view of our improved drill mechanism; and Fig. 3, a detail view of the outer end of the same, partly in section through the line *x x* of Fig. 2; and Fig. 4, a detail front view of the boring-tool.

The letter A indicates an ordinary drill, which is employed to sink an initial aperture in the bed or stratum of coal, slate, or other material in the desired direction to the depth of about three inches.

The letter B indicates the frame of the drill, which is provided with a screw, preferably of a tapering shape, which may be screwed into the initial aperture before mentioned, so as to hold the frame to the body or stratum of coal or other substance and give a bearing or purchase to the drill during the operation of drilling.

To the frame is hinged or otherwise adjustably secured one end of a short cross-bar, C, the other end of which is secured to said frame detachably by means of a pin, $c'$. This construction enables the bar C to be quickly thrown back for the convenient insertion of bits of different sizes.

To the cross-bar C, near one end, is hinged or otherwise adjustably secured one end of a cross-bar, D, which has a hole or short slot formed near its other end to receive a staple or eyebolt, $d'$, attached to the cross-bar C, and which projects above the bar D a sufficient distance to receive a pin or key, $d^3$, for securing the said bar D in place. It is evident, however, that other equivalent means may be employed without departing from the spirit of my invention. In the adjacent sides of the bars C and D, intermediate between their ends, are formed half-round notches or recesses, in which are cut screw-threads to engage the threads of a feed-screw, E, and serve as a nut for said screw.

To the outer end of the screw E is attached a crank, F, by which it is operated, and at its free extremity is formed a suitable socket, G, to receive the shank of a bit or drilling-tool, H.

In using my device the frame B is screwed into the hole made with the drill A. The drill H is then inserted, the feed-screw socket is applied to the shank of the bit or tool, and the bar D is turned down upon it and secured by means of the pin or key $d^2$. The crank F is then rotated and the bit or tool rapidly forced into the coal or other substance. When the bit has been forced in its entire length the bar D is released and turned back, the screw E is detached and drawn longitudinally back and replaced by a longer bit or connection, and the parts again arranged to permit the screw to operate, and the operation is thus carried on until the aperture is sunk the proper depth—about six feet.

It will be perceived that as constructed the frame sets out from the surface of the body to which it is attached, so as to give the bit or tool room to play, and also to provide for the employment of detachable bits or tools of different lengths, in order to furnish means to bore to any required depth.

Having thus described our invention, what we claim, and desire to secure by Letters Patent, is—

1. The combination, in a rock or coal drill, with the frame having a hollow tapering screw-threaded portion adapted to be secured directly to the body of the mass to be bored, and provided with a divided screw-nut, of the feed-screw having a socket for the reception of detachable bits, the said screw being adapted to work in the nut, substantially as and for the purpose set forth.

2. A tubular drill-frame, B, provided with a tapering external screw, and with means, substantially as described, for sustaining and operating the drill.

3. A tubular drill-frame, B, provided with a tapering external screw, combined with a drill and means for operating the same, substantially as shown and described.

4. The combination, with the drill-frame and the two-part nut-bar C D, having detachable pins $c$ $d^3$ and staple $d'$, of the screw E, adapted to work therein, and the bit H, the said screw being adapted to revolve and force the drill, substantially as described and set forth.

In testimony whereof I affix my signature in presence of two witnesses.

JOSIAH BLOSS.

Witnesses:
ROBT. BERRY,
GEO. W. HUSTON.

In testimony whereof I affix my signature in presence of two witnesses.

ELISHER J. WHITE.

Witnesses:
J. J. MCCARTHY,
C. D. DAVIS.